US011244149B2

(12) United States Patent
Ogawa

(10) Patent No.: US 11,244,149 B2
(45) Date of Patent: Feb. 8, 2022

(54) PROCESSING APPARATUS, PROCESSING METHOD, AND NON-TRANSITORY STORAGE MEDIUM

(71) Applicant: NEC CORPORATION, Tokyo (JP)

(72) Inventor: Shingo Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 10 days.

(21) Appl. No.: 16/787,592

(22) Filed: Feb. 11, 2020

(65) Prior Publication Data
US 2020/0257894 A1    Aug. 13, 2020

(30) Foreign Application Priority Data

Feb. 12, 2019  (JP) .............................. JP2019-022634

(51) Int. Cl.
*G06K 9/00* (2006.01)

(52) U.S. Cl.
CPC ..... *G06K 9/00288* (2013.01); *G06K 9/00255* (2013.01); *G06K 9/00926* (2013.01)

(58) Field of Classification Search
CPC .......... G06K 9/00288; G06K 9/00255; G06K 9/00926; G06K 2009/00932; G06K 9/00026; G06K 9/6255; G06K 9/00577; G06K 9/00892; G06K 9/00979; G06K 9/00281; G06K 9/627; G06K 2009/00738; G06K 9/00006; G06K 9/00617; G06K 9/00711; G06K 9/00771; G06K 9/00087; G06K 9/00335; G06K 9/00369; G06K 9/00718; G06K 9/3233; G06K 9/6218;
(Continued)

(56) References Cited

U.S. PATENT DOCUMENTS

2007/0122005 A1* 5/2007 Kage .................. G06K 9/00275
                                                           382/115
2008/0112621 A1* 5/2008 Gallagher .......... G06K 9/00288
                                                           382/190

(Continued)

FOREIGN PATENT DOCUMENTS

JP        2007-274264 A      10/2007

*Primary Examiner* — Nimesh Patel
(74) *Attorney, Agent, or Firm* — Sughrue Mion, PLLC

(57) ABSTRACT

The present invention provides a processing apparatus that includes: an image acquisition unit that acquires a face image to be processed in which a face of a person to be identified is included; a computing unit that computes an identification score between each of a plurality of reference face images registered in advance in association with visitor identification information and the face image to be processed; a display control unit that displays the plurality of reference face images of which the identification scores satisfy a predetermined condition on a display unit as candidates, and displays the reference face image having the highest identification score in a discriminable manner; a selection information acquisition unit that acquires selection information indicating one reference face image selected by a user input from among the reference face images displayed as the candidates; and a registration unit that registers information indicating a fact that the reference image is selected, in association with the visitor identification information which is associated with the selected reference face image.

8 Claims, 9 Drawing Sheets

(58) Field of Classification Search
CPC ....... G06K 9/6262; G06F 21/32; G06F 21/31; G06F 21/6245; G06F 2221/2113; G06F 2221/2149; G06F 21/606; H04L 12/282; H04L 63/0853; H04L 63/0861; H04L 41/28; H04L 63/00; H04L 63/0407; H04L 9/3231; H04L 2463/082; H04L 63/105; H04L 63/107; H04W 4/09; H04W 4/021; H04W 4/029; H04W 12/80; H04W 12/068; H04W 12/68; H04W 12/06
See application file for complete search history.

(56) References Cited

U.S. PATENT DOCUMENTS

| | | | |
|---|---|---|---|
| 2008/0137918 A1* | 6/2008 | Eura | G06K 9/6255 382/118 |
| 2010/0332648 A1* | 12/2010 | Bohus | G06Q 10/10 709/224 |
| 2017/0140212 A1* | 5/2017 | Lo | G06K 9/6206 |
| 2020/0082062 A1* | 3/2020 | Mequanint | G06F 21/32 |

* cited by examiner

FIG. 5

| VISITOR IDENTIFICATION INFORMATION | REFERENCE FACE IMAGE | FEATURE VALUE | SELECTION INFORMATION |
|---|---|---|---|
| NIPPON TARO | 0000001.jpg | *** | |
| GOTANDA HANAKO | 0000002.jpg | *** | ✓ |
| ...... | ...... | ...... | ...... |

PROCESSING APPARATUS, PROCESSING METHOD, AND NON-TRANSITORY STORAGE MEDIUM

This application is based on Japanese patent application No. 2019-022634, the content of which is incorporated hereinto by reference.

BACKGROUND

Technical Field

The present invention relates to a processing apparatus, a processing method, and a program.

Related Art

Japanese Patent Application Publication No. 2007-274264 discloses a technology in which a face is detected from an image, feature data of the detected face is extracted, the feature data of the extracted face and feature data stored in a database are compared with each other, a degree of similarity is decided, and the detected face is which individual's face is determined. In addition, Japanese Patent Application Publication No. 2007-274264 discloses a technology in which, when a user checks the determined person's face, the user can judge success or failure by looking at the displayed face of the individual and a collation image indicating a result of face recognition. Furthermore, Japanese Patent Application Publication No. 2007-274264 discloses a technology in which, when there are a plurality of face recognition records having a degree of similarity equal to or higher than a predetermined threshold value for a same person, the user can sequentially display the images in an order from the highest degree of similarity, and then, can select the success or failure.

SUMMARY

An accuracy of identification of an individual using the image analysis is not 100%. On the other hand, in some cases, an accuracy of 100% or close to 100% may be required depending on a scene for using. As the technology disclosed in Japanese Patent Application Publication No. 2007-274264, the above problem can be reduced by allowing the user to view a result of image analysis and input the success or failure. In this case, it is desired to provide a technology for supporting a work of the user to view the result of image analysis and input the information relating to the success or failure. Japanese Patent Application Publication No. 2007-274264 simply discloses the technology in which the user sequentially displays the images in an order from the highest degree of similarity and can select the success or failure if there is a plurality of face recognition records for the same person having a degree of similarity equal to or higher than the predetermined threshold value, which is insufficient.

The present invention has an object of providing a technology for supporting the work of the user to view the result of image analysis and input the information relating to the success or failure.

In an example embodiment, there is provided a processing apparatus including: an image acquisition unit that acquires a face image to be processed in which a face of a person to be identified is included; a computing unit that computes an identification score between each of a plurality of reference face images registered in advance in association with visitor identification information and the face image to be processed; a display control unit that displays the plurality of reference face images of which the identification scores satisfy a predetermined condition on a display unit as candidates, and displays the reference face image having a highest identification score in a discriminable manner; a selection information acquisition unit that acquires selection information indicating one reference face image selected by a user input from among the reference face images displayed as the candidates; and
a registration unit that registers information indicating a fact that the reference image is selected, in association with the visitor identification information which is associated with the selected reference face image.

In another example embodiment, there is provided a processing method executed by a computer, the method including: acquiring a face image to be processed in which a face of a person to be identified is included; computing an identification score between each of a plurality of reference face images registered in advance in association with visitor identification information and the face image to be processed; displaying the plurality of reference face images of which the identification scores satisfy a predetermined condition on a display unit as candidates, and displaying the reference face image having a highest identification score in a discriminable manner; acquiring selection information indicating one reference face image selected by a user input from among the reference face images displayed as the candidates; and registering information indicating a fact that the reference image is selected, in association with the visitor identification information which is associated with the selected reference face image.

In another example embodiment, there is provided a program that causes a computer to function as: an image acquisition unit that acquires a face image to be processed in which a face of a person to be identified is included; a computing unit that computes an identification score between each of a plurality of reference face images registered in advance in association with visitor identification information and the face image to be processed; a display control unit that displays the plurality of reference face images of which the identification scores satisfy a predetermined condition on a display unit as candidates, and displays the reference face image having a highest identification score in a discriminable manner; a selection information acquisition unit that acquires selection information indicating one reference face image selected by a user input from among the reference face images displayed as the candidates, and a registration unit that registers information indicating a fact that the reference image is selected, in association with the visitor identification information which is associated with the selected reference face image.

According to the present invention, it is possible to realize a technology for supporting a work in which a user views a result of image analysis and inputs information relating to the success or failure.

BRIEF DESCRIPTION OF THE DRAWINGS

The above and other objects, advantages and features of the present invention will be more apparent from the following description of certain preferred example embodiments taken in conjunction with the accompanying drawings, in which:

FIG. 5 is a diagram schematically illustrating an example of information processed by the processing apparatus in the present example embodiment;

DETAILED DESCRIPTION

Figure 1:
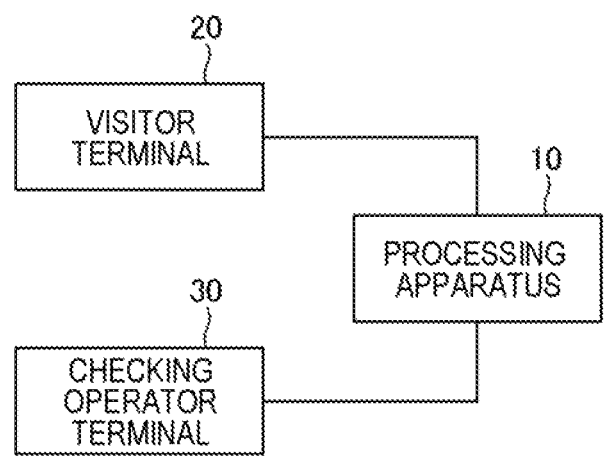
FIG. 1 is an example of a functional block diagram of a person identification system in a present example embodiment.

The invention will be now described herein with reference to illustrative embodiments. Those skilled in the art will recognize that many alternative embodiments can be accomplished using the teachings of the present invention and that the invention is not limited to the example embodiments illustrated for explanatory purposes.

First Example Embodiment

First, an overview and outline of a person identification system in the present example embodiment will be described. As illustrated in a functional block diagram in FIG. 1, the person identification system includes a processing apparatus 10, a visitor terminal 20, and a checking operator terminal 30.

The visitor terminal 20 is a terminal operated by a visitor. The visitor terminal 20 includes at least a camera, an input device that receives a user input, and a communication device that communicates with an external apparatus (such as a processing apparatus 10) by wire and/or wirelessly. Examples of the visitor terminal 20 include a tablet terminal, a smartphone, a mobile phone, a game machine, a personal computer, and a dedicated terminal, but not limited to. The visitor terminal 20 may be a visitor's own terminal, or may be a terminal that is installed in a facility or the like and is assumed to be used by an unspecified large number of visitors.

The visitor terminal 20 generates a face image of the visitor and transmits the face image to the processing apparatus 10.

The checking operator terminal 30 is a terminal operated by a checking operator that views a result of image analysis and inputs information relating to the success or failure. The checking operator terminal 30 includes at least an output device that outputs information, an input device that receives the user input, and a communication device that communicates with an external apparatus (such as a processing apparatus 10) by wire and/or wirelessly. Examples of the checking operator terminal 30 include a tablet terminal, a smartphone, a mobile phone, a game machine, a personal computer, a dedicated terminal, and the kike, but not limited to. The checking operator terminal 30 may be a checking operator's own terminal, or may be a terminal that is installed in a facility or the like and is assumed to be used by an unspecified large number of checking operators.

The checking operator terminal 30 acquires information from the processing apparatus and outputs the information via the output device. The checking operator terminal 30 receives the user input via the input device and transmits information indicating the input content to the processing apparatus 10.

The processing apparatus 10 acquires a face image to be processed including the face of the visitor generated by the visitor terminal 20. The processing apparatus 10 computes an identification score (a value indicating a degree of similarity between a face included in the reference face image and a face included in the face image to be processed) between the face image to be processed and each of a plurality of reference face images registered in advance in association with the visitor identification information. The processing apparatus 10 display a plurality of reference face images of which the identification scores satisfy a predetermined condition on the display unit of the checking operator terminal 30, as candidates. In addition, the processing apparatus 10 acquires selection information indicating one reference face image selected by the user input from among the reference face images displayed as the candidates, from the checking operator terminal 30. The processing apparatus 10 registers the information indicating the selection in association with the visitor identification information that is associated with the selected reference face image.

It should be noted that, when displaying the above-described candidates on the display unit of the checking operator terminal 30, the processing apparatus 10 displays the reference face image having the highest identification score in a discriminable manner. Therefore, the checking operator can easily recognize the reference face image having the higher possibility of being the correct face image among the displayed reference face images. As a result, effects such as improvement of work efficiency can be obtained by devising a way such as first checking the reference face image.

Next, an example of a hardware configuration of the processing apparatus 10, the visitor terminal 20, and the checking operator terminal 30 will be described. The functional units included in the processing apparatus 10, the visitor terminal 20, and the checking operator terminal 30 in the present example embodiment are configured by any combination of hardware and software mainly with a central processing unit (CPU) of any computer, memory, a program loaded in the memory, a storage unit (in addition to programs stored from the stage of shipping the apparatus in advance, programs downloaded from a storage medium such as a compact disc (CD) or from servers on the Internet can also be stored) such as a hard disk for storing the program, and a network connection interface. It will be understood by those skilled in the art that the configuration method and the apparatus may have various modifications.

Figure 2:
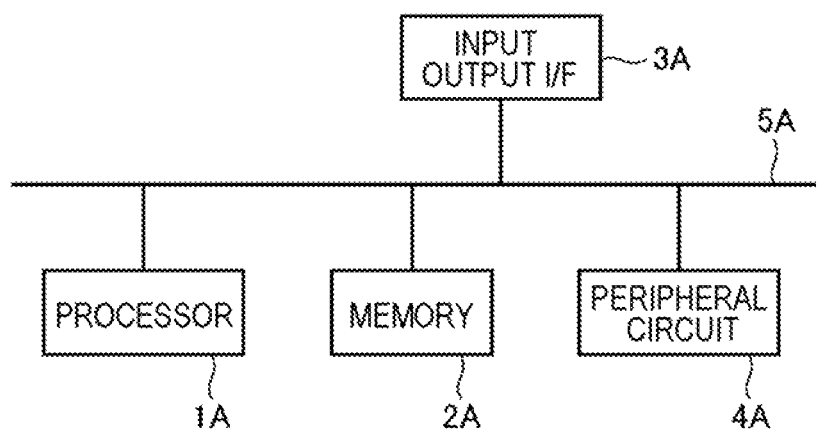
FIG. 2 is a diagram illustrating an example of a hardware configuration of a processing apparatus, a visitor terminal, and a checking operator terminal in the present example embodiment.

FIG. 2 is a block diagram illustrating an example of a hardware configuration of the processing apparatus 10, the visitor terminal 20, and the checking operator terminal 30 in the present example embodiment. As illustrated in FIG. 2, each of the processing apparatus 10, the visitor terminal 20, and the checking operator terminal 30 includes a processor 1A, a memory 2A, an input output interface 3A, a peripheral circuit 4A, and a bus 5A. The peripheral circuit 4A includes various modules. The processing apparatus 10, the visitor terminal 20, and the checking operator terminal 30 may not include the peripheral circuit 4A. It should be noted that, each of the processing apparatus 10, the visitor terminal 20, and the checking operator terminal may be configured by a plurality of apparatuses that are physically and/or logically separated. In this case, each of the plurality of apparatuses can include the hardware configuration described above.

The bus 5A is a data transmission path for the processor 1A, the memory 2A, the peripheral circuit 4A, and the input output interface 3A to transmit and receive the data to and from each other. The processor 1A is an arithmetic processing apparatus such as a CPU or a graphics processing unit (GPU). The memory 2A is a memory such as random access memory (RAM) or read only memory (ROM). The input output interface 3A includes an interface for acquiring information from the input device, an external apparatus, an external server, an external sensor, a camera, and the like, and an interface for outputting information to the output device, the external apparatus, the external server, and the like. The input device is, for example, a keyboard, a mouse, a microphone, a physical button, a touch panel, or the like. The output device is, for example, a display, a speaker, a printer, an emailer, or the like. The processor 1A can issue a command to each module and perform an arithmetic calculation based on the result of arithmetic by those modules.

Next, an example of a functional configuration and processing flow of the person identification system will be described with reference to the functional block diagram in FIG. 3 and a sequence diagram in FIG. 4. The processing in FIG. 4 is processing for identifying the visitor that operates the visitor terminal 20, and registering the result of the identification.

Figure 3:
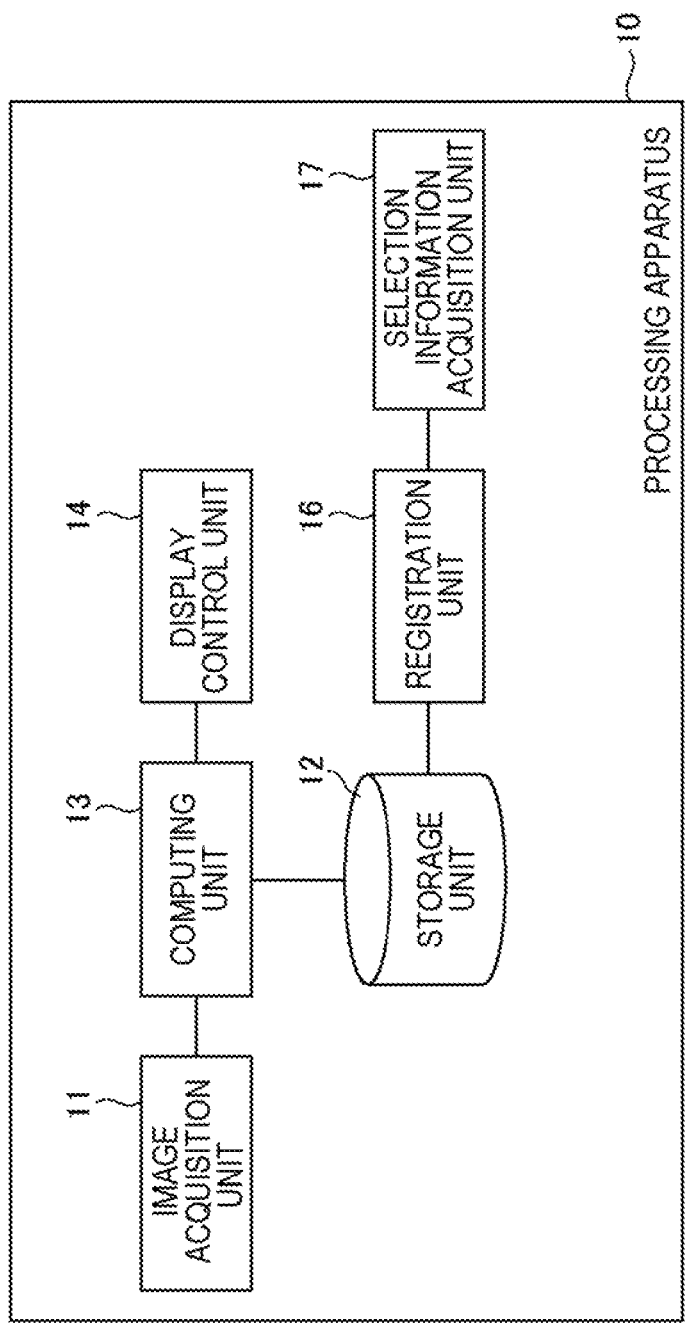
FIG. 3 is an example of a functional block diagram of the processing apparatus in the present example embodiment.

FIG. 3 is an example of a functional block diagram of the processing apparatus 10. As illustrated, the processing apparatus 10 includes an image acquisition unit 11, a storage unit 12, a computing unit 13, a display control unit 14, a registration unit 16, and a selection information acquisition unit 17. It should be noted that, the processing apparatus 10 may not include the storage unit 12. In this case, the external apparatus configured to be able to communicate with the processing apparatus 10 includes the storage unit 12.

Figure 4:
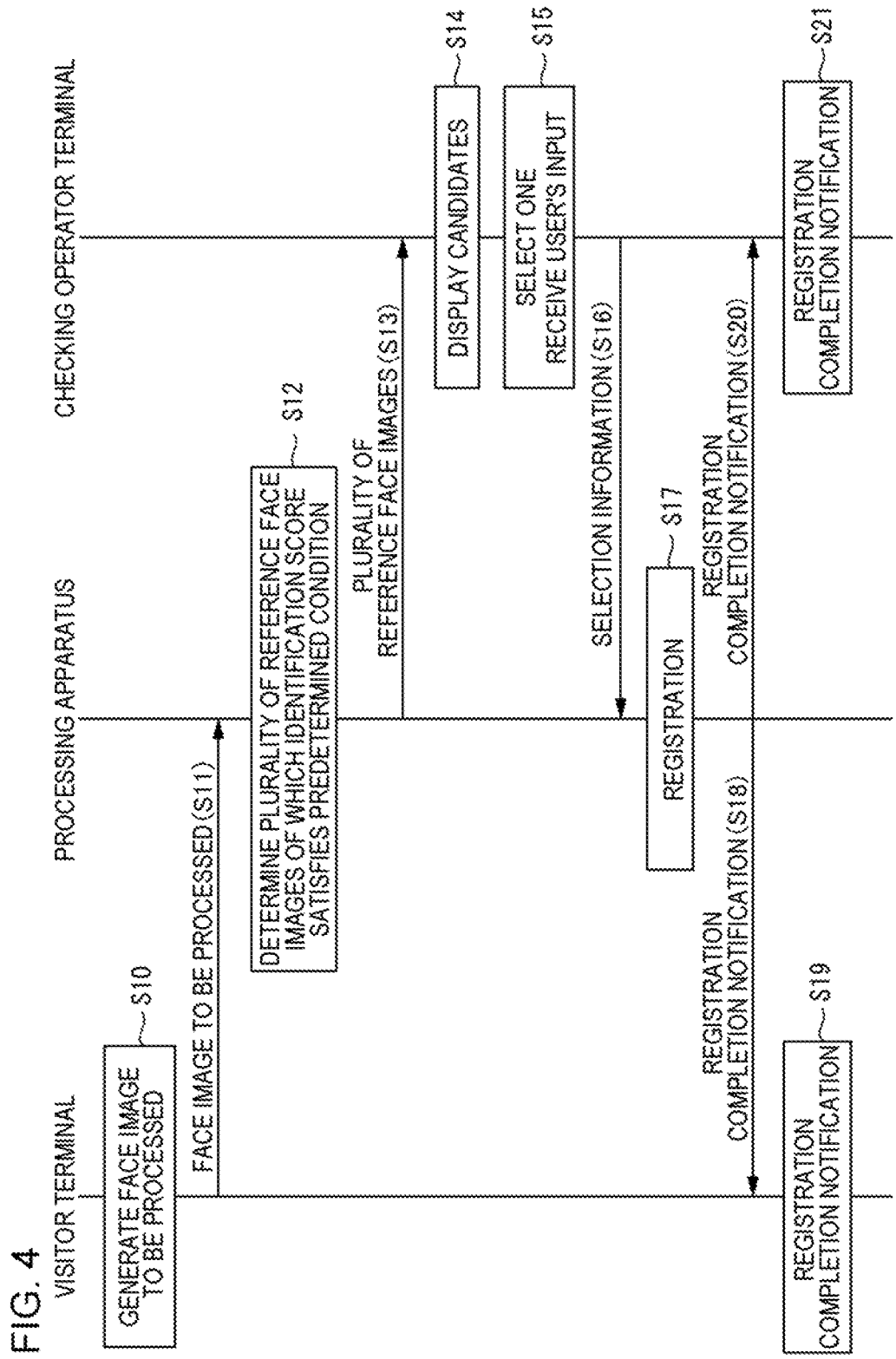
FIG. 4 is a sequence diagram illustrating an example of a process flow of the person identification system in the present example embodiment.

First, before the processing in FIG. 4 is performed, reference face images including the face of each of a plurality of visitors are registered in the storage unit 12 through any means. The storage unit 12 stores visitor identification information and a reference face image which includes the face of each visitor in association with each other. The storage unit 12 may further store a feature value extracted from the reference face image in association with the visitor identification information. Examples of the feature value include information (size, position, a distance between parts, or the like) relating to each part (eyes, nose, mouth, or the like) of the face.

FIG. 5 schematically illustrates an example of the information stored in the storage unit 12. In the illustrated example, the visitor identification information, a file name of the reference face image, the feature value of the reference face image, and selection information are associated with each other. The selection information will be described later.

In S10 in FIG. 4, the visitor operates the visitor terminal 20 to image his or her face. In response to the operation, the visitor terminal 20 generates a face image to be processed including the face of the visitor.

In S11, the visitor terminal 20 transmits the generated face image to be processed to the processing apparatus 10 in response to the generation of the face image to be processed or in response to the subsequent user input. The image acquisition unit 11 of the processing apparatus 10 acquires the face image to be processed transmitted from the visitor terminal 20.

It should be noted that, in the present specification, "acquisition" means at least one of "going and getting, by the own apparatus, data stored in another apparatus or a storage medium (active acquisition)" based on the user input or based on an instruction from a program, such as receiving the data by requesting or inquiring another apparatus and reading the data by accessing another apparatus or the storage medium, "inputting data output from another apparatus to the own apparatus (passive acquisition)" based on the user input or based on an instruction from a program, such as receiving distributed (or transmitted, push notified, or the like) data, or selecting and acquiring from received data or information, and "generating new data by editing the data (making a text, sorting data, extracting some data, changing the file format, and the like) to acquire new data".

In S12, the computing unit 13 of the processing apparatus 10 computes an identification score between each of a plurality of reference face images (reference face images stored in the storage unit 12) registered in association with the visitor identification information, and the face image to be processed acquired by the image acquisition unit 11. The identification score is a value indicating a degree of similarity between the face included in the reference face image and the face included in the face image to be processed. As the identification score increases, the face included in the reference face image is more similar to the face included in the face image to be processed. The identification score is sometimes called a degree of similarity, a degree of confidence, a degree of reliability, or the like.

For example, the computing unit 13 detects the face of a person from the face image to be processed acquired by the image acquisition unit 11 and extracts the feature value of the detected face. Then, based on the extracted feature value and the feature value of each reference face image stored in the storage unit 12, the above identification score can be computed. Since this processing is widely known, a detailed description thereof will not be repeated here.

After computing the identification score, the computing unit 13 determines a reference face image of which the identification scores satisfy a predetermined condition. The predetermined condition is a condition for selecting some images from those having a higher identification score, and the examples of the predetermined condition include "within the predetermined number of images from that having the highest identification score, "the identification score is equal to or greater than a reference value", "within the predetermined number of images from that having the highest identification score and the identification score is equal to or greater than the reference value", but not limited thereto.

In S13, the display control unit 14 of the processing apparatus 10 transmits a plurality of reference face images having an identification score satisfying the predetermined condition to the checking operator terminal 30, displays the plurality of reference face images as candidates on the display unit (display or the like). The display control unit 14 displays the reference face image having the highest identification score in a discriminable manner. It should be noted that, the display control unit 14 may display a plurality of reference face images of which the identification scores satisfy the predetermined condition in a row in an order from the highest identification score.

In S14, the checking operator terminal 30 displays a plurality of reference face images of which the identification scores satisfy the predetermined condition as candidates on the display unit (the display or the like). Then, the checking operator terminal 30 displays the reference face image having the highest identification score in a discriminable manner. It should be noted that, the checking operator terminal 30 may serially display the plurality of reference face images of which the identification scores satisfy the predetermined condition in a row in an order from the highest identification score.

Figure 6:
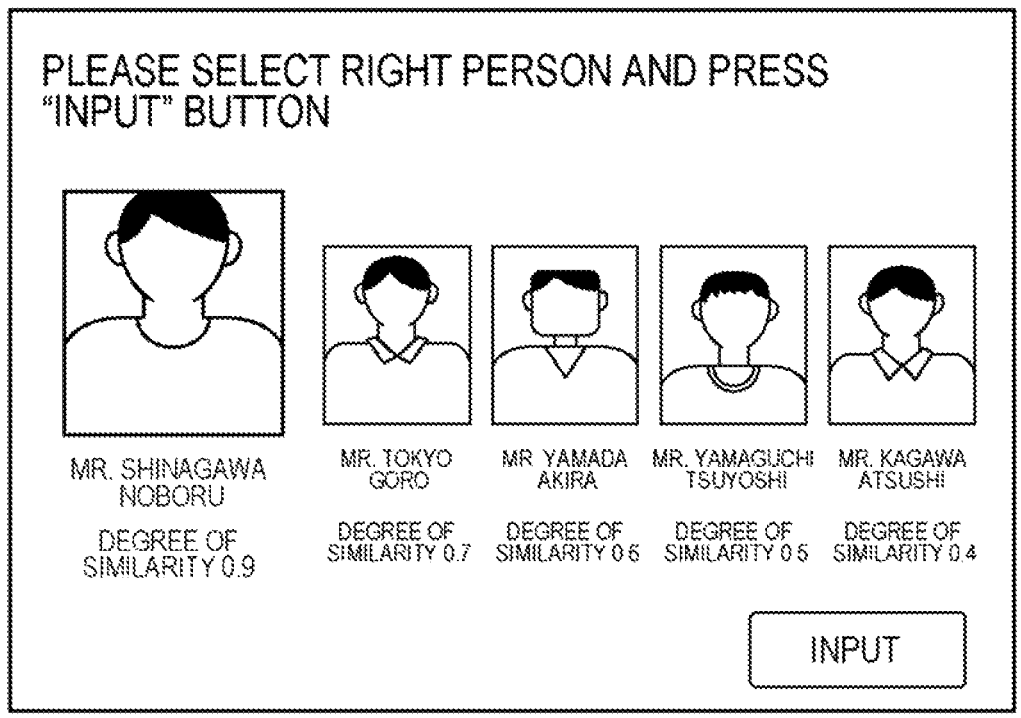
FIG. 6 is a diagram illustrating an example of a screen output by the person identification system in the present example embodiment.

FIG. 6 illustrates an example of information displayed on the display unit of the checking operator terminal 30. In the illustrated example, a plurality of reference face images of which the identification scores satisfy the predetermined condition are displayed as a list in an order from the highest identification score (the degree of similarity). A name and the identification score (degree of similarity) of each visitor are displayed in association with each reference image. In addition, by making the reference face image having the highest identification score larger than other reference face images, the reference face image having the highest identification score is displayed in a discriminable manner. It should be noted that, the means for displaying in a discriminable manner is not limited to this, and any means such as color, highlighted display, and character information can be used.

Returning to FIG. 4, in S15, the checking operator terminal 30 receives the user input for selecting one image from among the plurality of reference face images displayed as the candidates. For example, the checking operator visually recognizes the face of the visitor operating the visitor terminal 20, views the screen as illustrated in FIG. 6, and performs input to select one reference face image indicating the visitor from among the plurality of reference face images displayed on the screen.

The checking operator may operate the checking operator terminal 30 at a position where the face of the visitor operating the visitor terminal 20 can be directly visually recognized. For example, a visitor may be positioned on one side of a counter and a checking operator may be positioned on the opposite side, but not limited thereto.

Figure 7:
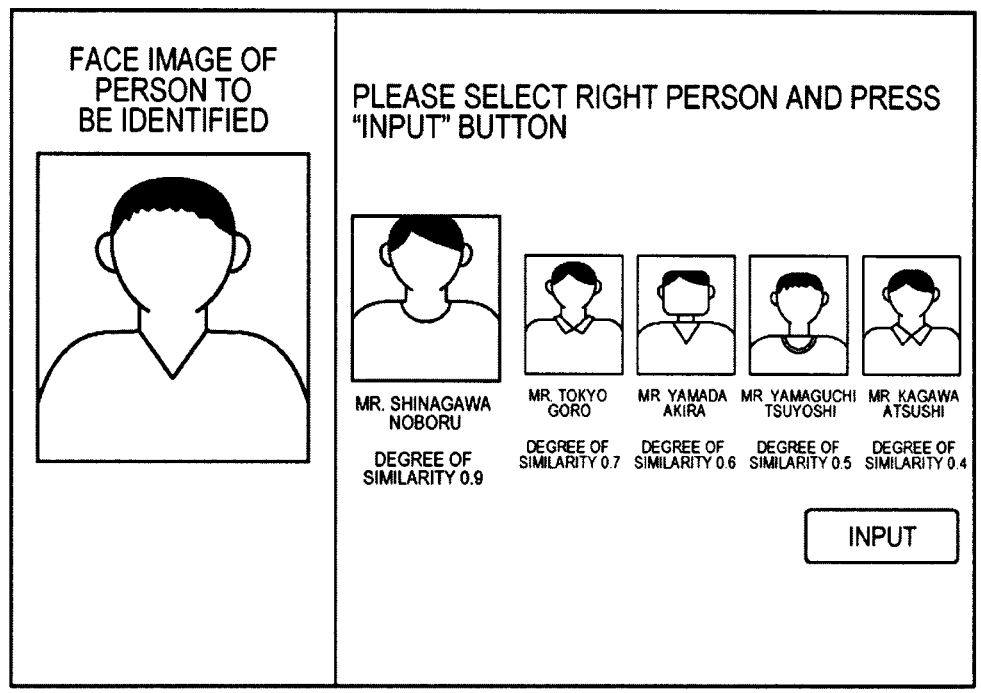
FIG. 7 is a diagram illustrating an example of a screen output by the person identification system in the present example embodiment.

In addition, as illustrated in FIG. 7, the checking operator terminal 30 may display a plurality of reference face images of which the identification scores satisfy the predetermined condition as candidates on the display unit and also display the face images to be processed on the display unit. The checking operator terminal 30 can acquire the face images to be processed from the processing apparatus 10 and can execute the displaying. In this example, the checking operator visually recognizes the face of the visitor operating the visitor terminal 20 by viewing the face image to be processed. In this case, the degree of freedom of the position where the checking operator operates the checking operator terminal 30 is increased.

Returning to FIG. 4, in S16, the checking operator terminal 30 transmits the selection information indicating the reference face image selected in S15 to the processing apparatus 10. The selection information acquisition unit 17 of the processing apparatus 10 acquires the selection information transmitted by the checking operator terminal 30.

In S17, the registration unit 16 of the processing apparatus 10 registers the information indicating a fact that the reference image is selected, in association with the visitor identification information that is associated with the selected reference face image. For example, the information indicating a fact that the reference image is selected is registered in the selection information column in the information illustrated in FIG. 5.

In S18, the registration unit 16 notifies the visitor terminal 20 of a fact that the registration is completed. In S19, the visitor terminal 20 notifies the visitor of the fact that the registration is completed via the output device.

In S20, the registration unit 16 notifies the checking operator terminal 30 of the fact that the registration is completed. In S21, the checking operator terminal 30 notifies the checking operator of the fact that the registration is completed via the output device.

Next, a usage example of the person identification system will be described. It should be noted that, the usage example here is merely an example, and the present invention is not limited thereto.

As an example, there is a usage example in which a visitor visiting a place such as an event hall is identified and the fact that the person is visiting is registered. In the event hall, a visitor terminal 20 and a checking operator terminal 30 are installed. For example, the event hall is provided with a reception counter through which visitors visiting go through. A receptionist is stationed at the reception counter and performs the reception operation. The visitor terminal 20 and the checking operator terminal 30 are installed at the reception counter.

In this example, the storage unit 12 stores a reference face image that is a face image of the visitor scheduled to visit.

The visitor who visits the event hall operates the visitor terminal 20 installed in the event hall to perform the visit registration. Specifically, the visitor operates the visitor terminal to capture his/her face image. The visitor terminal 20 generates an face image to be processed that is the face image of the visiting visitor according to the operation of the visitor, and transmits the face image to be processed to the processing apparatus 10 (S10 and S11 in FIG. 4).

When the image acquisition unit 11 of the processing apparatus 10 acquires the face image to be processed (S11 in FIG. 4), the computing unit 13 computes the identification score between each of reference face images that are face images of visitors scheduled to visit and the face image to be processed that is a face image of the visiting visitor, and then, determines a plurality of reference face images of which the identification scores satisfy the predetermined condition (S12 in FIG. 4).

Then, the display control unit 14 of the processing apparatus 10 transmits the plurality of reference face images of which the identification scores satisfy the predetermined condition to the checking operator terminal 30, and displays the plurality of reference face images on the display unit of the checking operator terminal 30 viewed by the receptionist, as the candidates (S13 in FIG. 4). The checking operator terminal 30 displays the plurality of reference face images on the display unit as the candidates (S14 in FIG. 4).

The receptionist visually recognizes the face of the visitor operating the visitor terminal at the reception counter and views the candidates displayed on the display unit of the checking operator terminal 30 (refer to FIG. 6), and then, performs the input to select one reference face image indicating the visitor from among the plurality of reference face images displayed on the screen. The checking operator terminal 30 receives the input (S15 in FIG. 4).

The checking operator terminal 30 transmits the selection information indicating the one reference face image selected by the receptionist to the processing apparatus 10 (S16 in FIG. 4). The selection information acquisition unit 17 of the processing apparatus 10 acquires the selection information indicating the one reference face image selected by the user input by the receptionist.

The registration unit 16 of the processing apparatus 10 registers the information indicating the visit in association with the visitor identification information that is associated with the selected reference face image (S17 in FIG. 4).

Thereafter, the registration unit 16 of the processing apparatus 10 notifies the visitor terminal 20 and the checking operator terminal 30 of the fact that the visit registration is completed (S18 and S20 in FIG. 4). The visitor terminal 20 notifies the visitor of the fact that the visit registration is completed (S19 in FIG. 4). In addition, the checking operator terminal notifies the receptionist of the fact that the visit registration is completed (S21 in FIG. 4).

Next, the advantageous effects of the person identification system will be described.

The person identification system narrows down the candidates of the person included in the face image to be processed using the image analysis, and thereafter, selects and registers one of the candidates based on the user input. By combining the image analysis and the human checking work, it is possible to reduce an inconvenience that the "accuracy of identification of an individual using the image analysis is not 100%". In addition, the human checking work is performed after narrowing down the candidates using image analysis, it is possible to reduce the efforts for the human checking work.

When displaying the candidates, the person identification system displays the reference face images having the highest identification score in a discriminable manner. Therefore, the checking operator can easily recognize the reference face image (including the face of the person to be identified) having the higher possibility of correct face image among the plurality of displayed reference face images. As a result, the effects such as improvement of work efficiency can be obtained by devising a way such as first checking the reference face image.

In addition, the person identification system can display a plurality of reference images in a row in an order from the highest identification score. Therefore, the checking operator can easily recognize the order of the higher possibility of correct face image among the plurality of displayed reference face images. For example, the effects such as improvement of work efficiency can be obtained by devising the checking of the reference face images in an order of the higher possibility of the correct face image.

In addition, the processing apparatus 10 acquires the face image to be processed generated by the visitor terminal 20 assumed as being operated by the visitor, and displays a plurality of reference face images on the checking operator terminal 30 (the terminal different from the visitor terminal 20) assumed as being operated by the receptionist as the candidates. The checking operator terminal 30 transmits the selection information indicating one image selected by the user input by the receptionist to the processing apparatus 10, and the processing apparatus 10 acquires the selection information.

If the candidates are displayed on the terminal that is used by the visitor for viewing, the visitor can view the reference face images or the like of other visitors. Some visitors dislike this situation. In the present example embodiment, such inconvenience can be avoided by displaying the candidates on the checking operator terminal 30.

Here, a modification example will be described. Up to this point, it is assumed that the processing apparatus 10, the visitor terminal 20, and the checking operator terminal 30 are physically and logically separated from each other. As a modification example, the processing apparatus 10 and the visitor terminal 20 may be physically and/or logically integrated. In addition, the processing apparatus 10 and the checking operator terminal 30 may be physically and/or logically integrated. Furthermore, the processing apparatus 10, the visitor terminal 20, and the checking operator terminal 30 may be physically and/or logically integrated. In the modification example also, the above-described advantageous effect is realized. It should be noted that, the modification example can be applied to all the following example embodiments.

Second Example Embodiment

Figure 8:
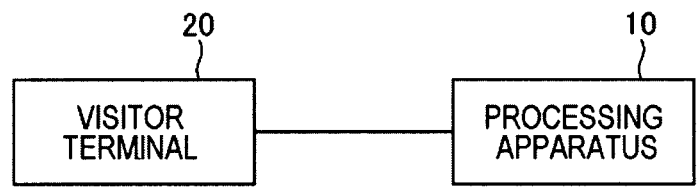
FIG. 8 is an example of a functional block diagram of the person identification system in the present example embodiment.

FIG. 8 illustrates an example of a functional block diagram of a person identification system in the present example embodiment. As illustrated in the drawing, the person identification system includes a processing apparatus 10 and a visitor terminal 20.

An example of the hardware configuration of the processing apparatus 10 and the visitor terminal 20 is the same as that in the first example embodiment.

An example of a functional block diagram of the processing apparatus 10 is similar to that in the first example embodiment and is illustrated in FIG. 3.

Figure 9:
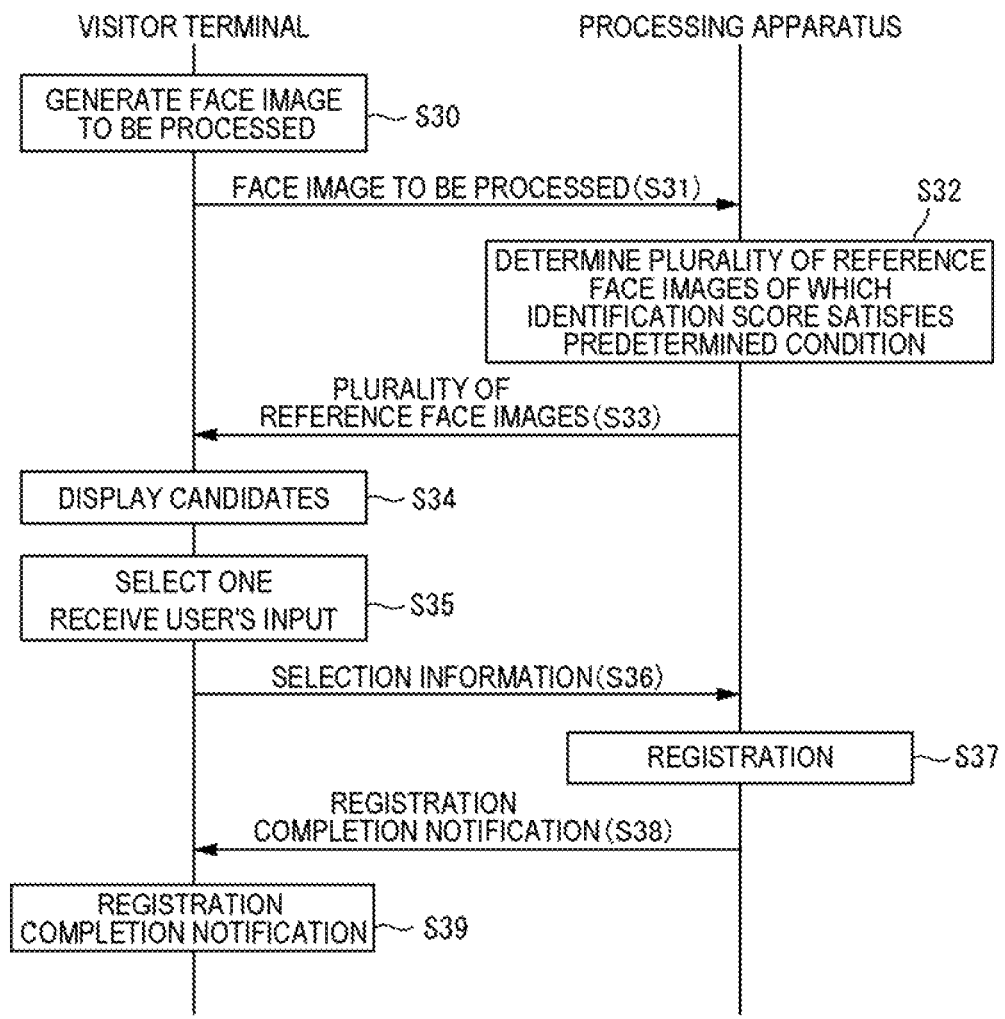
FIG. 9 is a sequence diagram illustrating an example of a process flow of the person identification system in the present example embodiment.

The sequence diagram in FIG. 9 illustrates an example of a process flow of the person identification system in the present example embodiment. The processing illustrated in S30 to S39 is similar to the processing in S10 to S19 illustrated in FIG. 4. As described, the visitor terminal 20 in the present example embodiment performs not only the processing performed by the visitor terminal 20 described in the first example embodiment (S10, S11, and the like in FIG. 4), but also performs the processing (S13, S14, S15, S16, and the like in FIG. 4) performed by the checking operator terminal 30.

That is, in the present example embodiment, the processing apparatus 10 displays a plurality of reference face images of which the identification scores satisfy the predetermined condition on the display unit of the visitor terminal 20 as the candidates. Then, the visitor terminal 20 receives a visitor's input of selecting the reference face image which includes the face of the visitor from among the reference face images displayed as the candidates. For example, when using the person identification system in an event within a friends group (such as an in-house competition), there is no problem even if each visitor's reference face image is viewed by another visitor. In such a situation, the person identification system in the present example embodiment can be used.

In a case of the person identification system in the present example embodiment, the advantageous effects similar to that of the person identification system in the first example embodiment can be realized. In addition, since it is not necessary to prepare both the visitor terminal 20 and the checking operator terminal 30, the cost can be reduced. In addition, since it is not necessary to prepare a checking operator, the cost can be reduced.

Third Example Embodiment

The person identification system in the present example embodiment is different from that in the first example embodiment in a point of having a function in which if a reference face image registered in association with information indicating a fact of being previously selected is present among a plurality of reference face images of which the identification scores satisfy the predetermined condition, the reference face image is prevented from being erroneously selected again. Other configurations are the same as those in the first example embodiment.

An example of a functional block diagram of the person identification system in the present example embodiment is illustrated in FIG. 1 or FIG. 8. An example of the hardware configuration of the processing apparatus 10, the visitor terminal 20, and the checking operator terminal 30 is the same as that in the first and second example embodiments.

An example of a functional block diagram of the processing apparatus 10 is similar to that in the first example embodiment and is illustrated in FIG. 3. An example of the process flow of the person identification system is illustrated in FIG. 4 or FIG. 9.

In the person identification system in the present example embodiment, the configuration of the display control unit 14 of the processing apparatus 10 is different from that in the first and second example embodiments. Other configurations are the same as those of the person identification system in the first or second example embodiment.

Figure 10:
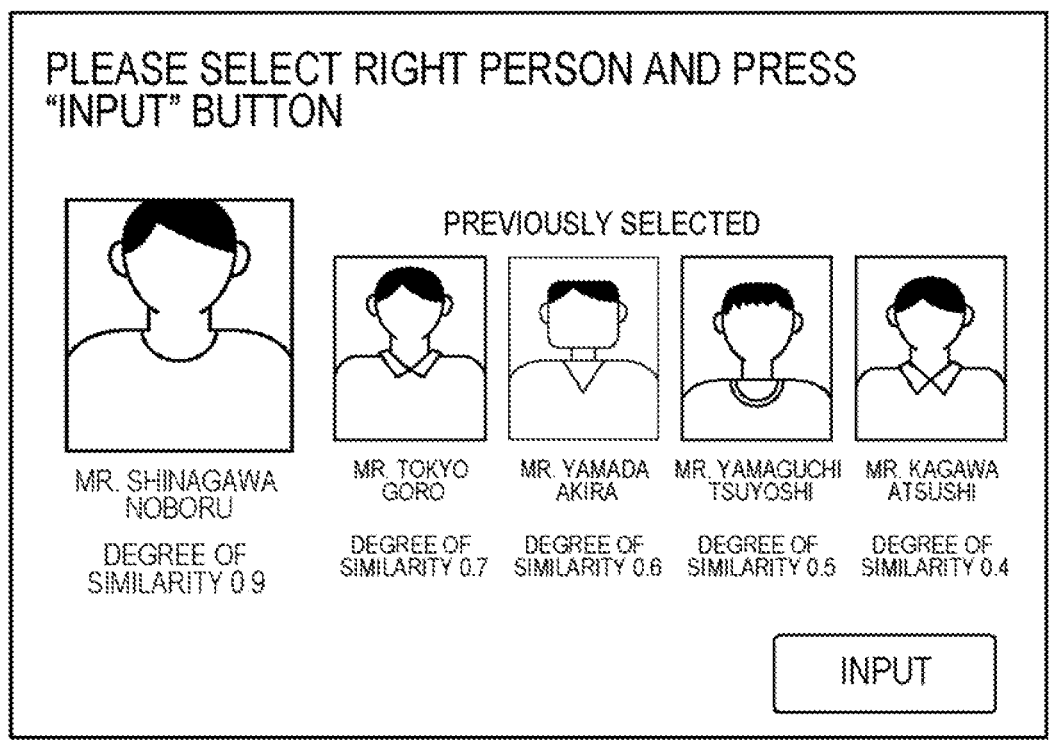
FIG. 10 is a diagram illustrating an example of a screen output by the person identification system in the present example embodiment.

Among a plurality of reference face images displayed as the candidates, the display control unit 14 of the processing apparatus 10 displays the reference face image in which information indicating a fact that the reference image is selected is registered in association with the visitor identification information, in a discriminable manner. An example is illustrated in FIG. 10. In the example illustrated, the reference face image in which the information indicating the fact that the reference image is selected is registered in association with the visitor identification information is indicated by the words "previously selected" in a discriminable manner. It should be noted that, the means for displaying in a discriminable manner is not limited to this, and any means such as color, highlight display, and character information can be used. According to such a display control, it is possible to prevent the reference face image that has been selected previously from being erroneously selected again.

As another example, the display control unit 14 may perform a control such that the reference face image in which information indicating a fact that the reference image is selected is registered in association with the visitor identification information, among a plurality of reference face images of which the identification scores satisfy the predetermined condition, is not displayed as the candidate. By such a display control also, it is possible to prevent the reference face image that has been selected previously from being erroneously selected again.

In the case of the person identification system in the present example embodiment, the advantageous effects same as the person identification systems in the first and second example embodiments can be realized. In addition, it is possible to prevent the selected reference face image from being erroneously selected again.

As described above, the present invention is described with reference to the example embodiments (and examples); however, the present invention is not limited to the above-described example embodiments (and examples). Various changes that can be understood by those skilled in the art can be made to the configuration and details of the present invention within the scope of the present invention.

A part or all of the above example embodiments may be described as in the following supplementary notes, but is not limited thereto.

1. A processing apparatus including: an image acquisition unit that acquires a face image to be processed in which a face of a person to be identified is included;
a computing unit that computes an identification score between each of a plurality of reference face images registered in advance in association with visitor identification information and the face image to be processed;
a display control unit that displays the plurality of reference face images of which the identification scores satisfy a predetermined condition on a display unit as candidates, and displays the reference face image having a highest identification score in a discriminable manner;
a selection information acquisition unit that acquires selection information indicating one reference face image selected by a user input from among the reference face images displayed as the candidates; and
a registration unit that registers information indicating a fact that the reference image is selected, in association with the visitor identification information which is associated with the selected reference face image.

2. The processing apparatus according to 1,
in which the display control unit displays the plurality of reference face images of which the identification scores satisfy the predetermined condition in a row in an order from the highest identification score.

3. The processing apparatus according to 1 or 2,
in which the display control unit displays the reference face image of which the information indicating a fact that the reference image is selected is registered in association with the visitor identification information, among the plurality of reference face images displayed as the candidates, in a discriminable manner.

4. The processing apparatus according to 1 or 2,
in which the display control unit does not display the reference face image of which the information indicating a fact that the reference image is selected is registered in association with the visitor identification information among the plurality of reference face images of which the identification scores satisfy the predetermined condition, as the candidate.

5. The processing apparatus according to any one of 1 to 4,
in which the image acquisition unit acquires the face image to be processed which is a face image of a visiting visitor,
the computing unit computes an identification score between each of the reference face images that are face images of visitors scheduled to visit and the face image to be processed,
the display control unit displays the plurality of reference face images of which the identification scores satisfy the predetermined condition on the display unit viewed by a visitor or a receptionist, as the candidates,
the selection information acquisition unit acquires the selection information indicating one reference face image selected by the user input by the visitor or the receptionist, and
the registration unit registers information indicating the visit in association with the visitor identification information which is associated with the selected reference face image.

6. The processing apparatus according to any one of 1 to 5,
in which the image acquisition unit acquires the face image to be processed generated by a visitor terminal assumed as being operated by a visitor,
the display control unit displays the plurality of reference face images of which the identification scores satisfy the predetermined condition on a terminal different from the visitor terminal assumed as being operated by a receptionist, as the candidates, and the selection information acquisition unit acquires the selection information indicating one reference face image selected by the user input by the receptionist.

7. A processing method executed by a computer, the method including:
acquiring a face image to be processed in which a face of a person to be identified is included;
computing an identification score between each of a plurality of reference face images registered in advance in association with visitor identification information and the face image to be processed;
displaying the plurality of reference face images of which the identification scores satisfy a predetermined condition on a display unit as candidates, and displaying the reference face image having a highest identification score in a discriminable manner;
acquiring selection information indicating one reference face image selected by a user input from among the reference face images displayed as the candidates; and
registering information indicating a fact that the reference image is selected, in association with the visitor identification information which is associated with the selected reference face image.

8. A program that causes a computer to function as:
an image acquisition unit that acquires a face image to be processed in which a face of a person to be identified is included;
a computing unit that computes an identification score between each of a plurality of reference face images registered in advance in association with visitor identification information and the face image to be processed;
a display control unit that displays the plurality of reference face images of which the identification scores satisfy a predetermined condition on a display unit as candidates, and displays the reference face image having a highest identification score in a discriminable manner;
a selection information acquisition unit that acquires selection information indicating one reference face image selected by a user input from among the reference face images displayed as the candidates; and
a registration unit that registers information indicating a fact that the reference image is selected, in association with the visitor identification information which is associated with the selected reference face image.

It is apparent that the present invention is not limited to the above example embodiment, and may be modified and changed without departing from the scope and spirit of the invention.

REFERENCE NUMERALS

1A: processor
2A: memory
3A: input output I/F
4A: peripheral circuit
5A: bus
10: processing apparatus
11: image acquisition unit
12: storage unit
13: computing unit
14: display control unit
16: registration unit
17: selection information acquisition unit
20: visitor terminal
30: checking operator terminal

What is claimed is:

1. A processing apparatus comprising:
at least one memory configured to store one or more instructions; and
at least one processor configured to execute the one or more instructions to:
acquire a face image to be processed in which a face of a person to be identified is included;
compute an identification score between each of a plurality of reference face images registered in advance in association with visitor identification information and the face image to be processed;
display the plurality of reference face images of which the identification scores satisfy a predetermined condition on a display unit as candidates, and display the reference face image having a highest identification score in a discriminable manner;
acquire selection information indicating one reference face image selected by a user input from among the reference face images displayed as the candidates; and
register information indicating a fact that the reference image is selected, in association with the visitor identification information which is associated with the selected reference face image.

2. The processing apparatus according to claim 1, wherein the processor is further configured to execute the one or more instructions to display the plurality of reference face images of which the identification scores satisfy the predetermined condition in a row in an order from the highest identification score.

3. The processing apparatus according to claim 1, wherein the processor is further configured to execute the one or more instructions to display the reference face image of which the information indicating a fact that the reference image is selected is registered in association with the visitor identification information, among the plurality of reference face images displayed as the candidates, in a discriminable manner.

4. The processing apparatus according to claim 1, wherein the processor is further configured to execute the one or more instructions not to display the reference face image of which the information indicating a fact that the reference image is selected is registered in association with the visitor identification information among the plurality of reference face images of which the identification scores satisfy the predetermined condition, as the candidate.

5. The processing apparatus according to claim 1, wherein the processor is further configured to execute the one or more instructions to:
acquire the face image to be processed which is a face image of a visiting visitor,
compute the identification score between each of the reference face images that are face images of visitors scheduled to visit and the face image to be processed,
display the plurality of reference face images of which the identification scores satisfy the predetermined condition on the display unit viewed by a visitor or a receptionist, as the candidates,
acquire the selection information indicating one reference face image selected by the user input by the visitor or the receptionist, and
register information indicating the visit in association with the visitor identification information which is associated with the selected reference face image.

6. The processing apparatus according to claim 1,
wherein the processor is further configured to execute the one or more instructions to:
acquire the face image to be processed generated by a visitor terminal assumed as being operated by a visitor,
display the plurality of reference face images of which the identification scores satisfy the predetermined condition on a terminal different from the visitor terminal assumed as being operated by a receptionist, as the candidates, and
acquire the selection information indicating one reference face image selected by the user input by the receptionist.

7. A processing method executed by a computer, the method comprising:
acquiring a face image to be processed in which a face of a person to be identified is included;
computing an identification score between each of a plurality of reference face images registered in advance in association with visitor identification information and the face image to be processed;
displaying the plurality of reference face images of which the identification scores satisfy a predetermined condition on a display unit as candidates, and displaying the reference face image having a highest identification score in a discriminable manner;
acquiring selection information indicating one reference face image selected by a user input from among the reference face images displayed as the candidates, and
registering information indicating a fact that the reference image is selected, in association with the visitor identification information which is associated with the selected reference face image.

8. A non-transitory storage medium storing a program that causes a computer to function as:
an image acquisition unit that acquires a face image to be processed in which a face of a person to be identified is included;
a computing unit that computes an identification score between each of a plurality of reference face images registered in advance in association with visitor identification information and the face image to be processed;
a display control unit that displays the plurality of reference face images of which the identification scores satisfy a predetermined condition on a display unit as candidates, and displays the reference face image having a highest identification score in a discriminable manner;
a selection information acquisition unit that acquires selection information indicating one reference face image selected by a user input from among the reference face images displayed as the candidates, and
a registration unit that registers information indicating a fact that the reference image is selected, in association with the visitor identification information which is associated with the selected reference face image.

\* \* \* \* \*